N. SANDERS.
DISK PLOW.
APPLICATION FILED NOV. 8, 1915.

1,186,441.

Patented June 6, 1916.

Inventor:
Newell Sanders.

UNITED STATES PATENT OFFICE.

NEWELL SANDERS, OF CHATTANOOGA, TENNESSEE.

DISK PLOW.

1,186,441.  Specification of Letters Patent.  Patented June 6, 1916.

Application filed November 8, 1915. Serial No. 60,319.

*To all whom it may concern:*

Be it known that I, NEWELL SANDERS, a citizen of the United States, residing at Chattanooga, Tennessee, have invented certain new and useful Improvements in Disk Plows, of which the following is a specification.

My present invention relates to improvements in disk plows such as are drawn by traction engines, and aims to provide a simple, economical and durable construction which will enable the plow to accurately follow the engine when it progresses straight forward and when it is turning curves as at the corners of the land.

Figure 1:
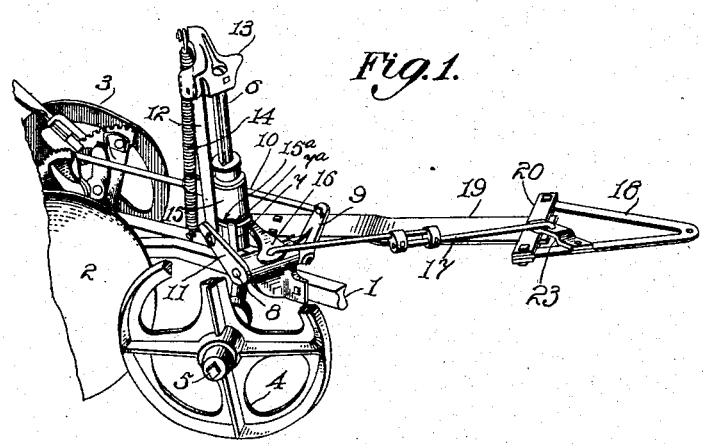
Figure 2:
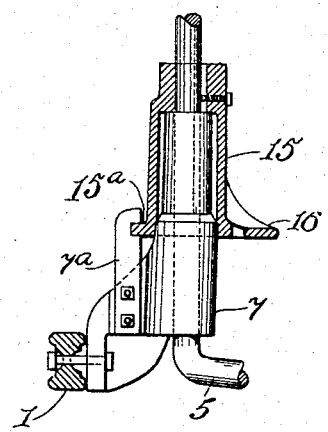
Figure 3:
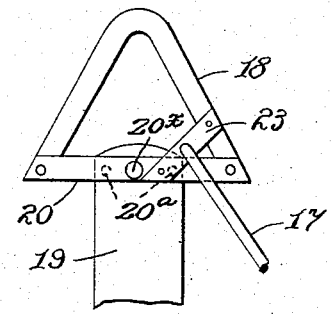

The invention includes the novel features of construction and arrangement and combination of parts as defined by the appended claim, an embodiment of the invention being hereinafter described and illustrated in the accompanying drawings, in which Figure 1 is a perspective view of a sufficient portion of a plow to illustrate the application of my invention thereto, and Fig. 2 is a detail view of the splined sleeve and associated parts; Fig. 3 is a detail view of the hitch.

Referring by reference characters to this drawing, the numeral 1 designates the front portion of the frame, 2 the forward disk, and 3 the land side wheel of a plow. The rear portion of the plow is omitted from the drawing as being unnecessary for an understanding of my invention.

4 designates the front furrow wheel, which is journaled on the axle 5 which projects from the lower end of the vertical shaft 6, which shaft is journaled in a bearing 7, carried by the plow frame. This shaft is raised or lowered by means of a rock shaft 8 journaled in a bearing carried by the plow frame having at one end an arm 9 adapted to be connected by a rod 10, with the usual operating lever (not shown), and at the other end an arm 11 connected by a link 12 with a bracket 13 at the upper end of shaft 6. The weight of the plow beam and parts carried thereby is counterbalanced by a spring 14.

In order that the wheel 4 may be steered to cause the plow to properly follow the tractor without interfering with the vertical adjustment, I provide on the shaft around the bearing 7 a sleeve 15 which is splined to the shaft and has an annular rib $15^a$ which is engaged by a retaining lug $7^a$ attached to the bearing 7 which prevents vertical movement of the sleeve 15 independently of bearing 7, but permits rotary movement of said sleeve. An arm 16 carried by this sleeve is connected by a (preferably adjustable) rod 17 with a hitch member or clevis 18 pivoted to the front end of the tongue 19.

When the engine is pulling straight ahead the hitch will be held in line with the tongue, and through rod 17 and arm 16 on sleeve 15 splined on shaft 6 will cause the wheel 4 to be held in a straight forward position. The turning of the tractor, however, will swing the hitch or clevis, and through the connections referred to turn the wheel 4, and the connections described will be unaffected by the vertical adjustment of the plow.

The hitch is shown in detail in Fig. 3, and includes a cross piece 20 pivoted centrally of its length to the tongue 19, said cross bar having attached thereto the angular member shown.

An angularly arranged bar 23 is attached to the clevis near one corner connecting the cross bar with one of the inclined sides. This serves as a brace and as a means for the attachment of the rod 17 to the clevis, this point of attachment being thus set off to one side of the center of the tongue.

It will be noticed that in addition to the central hole for the pivot $20^x$ which attaches the hitch to the tongue the end of the tongue is provided with other holes indicated at $20^a$ by which the pivot of the draft device may be changed to agree with the line of draft of the plow.

What I claim is:—

In a wheel plow, a frame, a substantially vertically disposed cylindrical bearing member carried thereby, a front steering wheel having a substantially vertical spindle journaled in said bearing, means for effecting vertical adjustment of the spindle in said bearing, a sleeve encircling said bearing member and having a part splined to said spindle above said bearing member and freely slidable vertically on said spindle, said sleeve having an annular rib, a lug carried by said bearing engaging said annular rib, a pivoted draft device, and a connection between said draft device and sleeve for turning the latter and spindle according to the direction of draft.

In testimony whereof, I affix my signature in presence of two witnesses.

NEWELL SANDERS.

Witnesses:
SHERMAN SANDERS,
J. B. ALLIN, Jr.